(12) United States Patent
Kim et al.

(10) Patent No.: US 7,391,833 B2
(45) Date of Patent: Jun. 24, 2008

(54) CHANNEL ESTIMATOR ADOPTING MASKING

(75) Inventors: Jae Hyoung Kim, Incheon (KR); Sung Ryong Hong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 686 days.

(21) Appl. No.: 10/792,317

(22) Filed: Mar. 2, 2004

(65) Prior Publication Data

US 2004/0174940 A1   Sep. 9, 2004

(30) Foreign Application Priority Data

Mar. 3, 2003   (KR) ........................ 10-2003-0013146

(51) Int. Cl.
*H04B 1/10* (2006.01)
(52) U.S. Cl. ........................................ 375/351
(58) Field of Classification Search ................ 375/346, 375/351, 316, 340, 343
See application file for complete search history.

(56) References Cited

U.S. PATENT DOCUMENTS 6,255,898 B1 *   7/2001   Ono et al. .................... 327/551
7,161,972 B2 *   1/2007   Huh et al. .................... 375/147

* cited by examiner

*Primary Examiner*—Kevin Burd
(74) *Attorney, Agent, or Firm*—Lee, Hong, Degerman, Kang & Schmadeka

(57) ABSTRACT

Disclosed is a channel estimator adopting masking. In a channel estimator using a CIR (channel impulse response) estimating value, the present invention includes a CIR masking unit removing a noise included in the CIR estimating value. Accordingly, the present invention is capable of filtering noises resulting from finiteness of the PN sequence used in finding the cross correlator, thereby enabling to enhance accuracy for the CIR estimating value. And, the enhanced accuracy for the CIR estimating value enables to improve tracking performance to the time variable channel of the frequency domain equalizer using the channel estimator.

13 Claims, 5 Drawing Sheets

FIG. 5A

|  |  | Raw CIR | Masked CIR |
|---|---|---|---|
| measurement times of time average. | 0 | X | 26.7dB |
|  | 2 | 17.3dB |  |
|  | 4 | 20.3dB |  |
|  | 8 | 22.5dB |  |

FIG. 5B

|  |  | Raw CIR | Masked CIR |
|---|---|---|---|
| measurement times of time average. | 0 | X | 22.7dB |
|  | 2 | X |  |
|  | 4 | X |  |
|  | 8 | 20.2dB |  |

FIG. 5C

|  |  | Raw CIR | Masked CIR |
|---|---|---|---|
| measurement times of time average. | 0 | X | 21.5dB |
|  | 2 | X |  |
|  | 4 | X |  |
|  | 8 | X |  |

US 7,391,833 B2

CHANNEL ESTIMATOR ADOPTING MASKING

This application claims the benefit of the Korean Application No. P2003-13146 filed on Mar. 3, 2004, which is hereby incorporated by reference.

BACKGROUND OF THE INVENTION

1. Field of the Invention

The present invention relates to a channel estimator, and more particularly, to a channel estimator adopting masking.

2. Discussion of the Related Art

Generally, a terrestrial TV signal of an 8-VSB (vestigial sideband) system passes through a dynamic multipath channel from a transmitting end to arrive at a receiving end. The received signal is severely distorted by interference with an adjacent signal, whereby adoption of an equalizer is needed to restore an original signal from the distorted signal.

A receiver, which receives a signal transmitted from a single carrier transmission system adopting VSB, mostly uses an equalizer implemented in a time domain (hereinafter called time domain equalizer). And, a non-linear decision feedback equalizer (DEF) is the most representative.

The time domain equalizer adopts LMS (least-mean-squares) to facilitate its implementation. Yet, since error propagation occurs in case of severe channel distortion, the time domain equalizer fails to achieve re-convergence even if a channel status becomes good again. Moreover, the time domain equalizer fails to operate robustly when a main path in a time variable channel varies, frame synchronization of the received signal is frequently broken.

Most of the above-described defects of the time domain equalizer can be settled by means of using an equalizer that adopts zero forcing in a frequency domain after finding an impulse response of a channel using a channel estimator.

Namely, the equalizer implemented within the frequency domain enables to show its performance constantly regardless of the number of multipath or a degree of distortion of the received signal. And, the equalizer enables to operate robustly without generating frame errors like the time domain equalizer under a channel environment that a main path varies according to time. Moreover, the equalizer can be implemented more simply than the time domain equalizer as a range of multipath that is to be equalized gets wider.

In this case, performance of the frequency domain equalizer through channel estimation substantially depends on accuracy and frequency of the channel estimation, whereby various estimating methods are actively tried.

A system, to which a frequency domain equalizer through channel estimation is applied, according to a related art is explained by referring to the attached drawing as follows.

FIG. 1 is a block diagram of a system to which a frequency domain equalizer through channel estimation is applied according to a related art.

Referring to FIG. 1, the system consists of a channel estimator 101 estimating a CIR (channel impulse response) $\hat{h}(n)$ from a received baseband signal y(n), a first FFT (frequency field transform) 102 transforming the base band signal into a signal of a frequency domain, a second FFT 103 transforming the estimated CIR $\hat{h}(n)$ into a signal of the frequency domain, a frequency domain equalizer 104 executing equalization by zero forcing using the baseband signal y(n) and CIR $\hat{h}(n)$ transformed into the signals of the frequency domain, respectively, and an IFFT 105 inverse-transforming the equalized signals of the frequency domain into signals of a time domain.

A signal equalized by zero forcing includes a colored noise. In order to remove such a colored noise, the system further consists of a noise predictor 106 computing a noise prediction value $\hat{v}(n)$ from an output $\hat{h}(n)+v(n)$ of the IFFT 105 and an adder 108 removing the colored noise by adding the output $\hat{h}(n)+v(n)$ of the IFFT 105 to the noise prediction value $\hat{v}(n)$ outputted from the noise predictor 106.

Specifically, the channel estimator 101 is explained in detail as follows.

As estimating methods of the channel estimator 101, there are an estimating method using a training signal only, the blind method operating regardless of a training signal, and the semi-blind method using a training signal for a training section and operating as blind for the rest section except the training section.

Three kinds of methods, which can be simply implemented relatively, among practical implementations of the above-explained two methods are explained as follows.

1) A Method Using Cross Correlation between Noted Training Signal and Actually-Received Training Signal Only In case of a channel estimator using cross correlation only, a channel estimating value is relatively inaccurate despite its simplicity. In this case, in order to enhance accuracy of the cross correlation, it may be considered to increase the number of training symbols used for cross correlating calculation. Yet, since a peak shows up due to finiteness of PN sequence occurring by 63-symbol cycle, the structure of a VSB field sink part, where PN63 sequence is overlapped, has difficulty in accurate channel estimation.

2) Least Square (LS)

The constraint of the above method 1) can be overcome by channel estimation of LS. Namely, the LS removes auto correlating relation between training symbols used in cross correlating calculation within a training section from cross correlation, thereby fitting VSB reception environment.

3) Sub-Channel Response Matching (SRM) Using Both Data and Training Symbol

In case of sub-channel response matching (SRM), it is able to estimate a channel accurately only if a length of CIR is accurately known. Hence, SRM is not appropriate for an environment that a characteristic of such a certain channel as a terrestrial channel varies according to time severely.

Hence, in case of a channel estimator using cross correlation including LS, when noise caused by data is included while the cross correlation is executed, the influence of the noise caused by the data can be reduced by taking a time domain average using the fact that the data is a probability function of which average is '0'. Thus, in case of a channel estimator using time average, the accuracy of the channel estimating value can be enhanced by finding a channel estimation sequence value every field and by taking the average of the time domain.

However, since a moving average should be taken to remove a bad influence of data included in CIR, very poor characteristics appear on the time domain estimator updated by symbol unit in case of a time variable channel.

Meanwhile, as another method of removing the influence of data in channel estimation, there is a technique of thresholding, in which CIR, as shown in Equation 1, below a specific level ($\epsilon$) is regarded as '0'.

$$\hat{h}(n)=0, \text{ if } |\hat{h}(n)|<\epsilon \hat{h}(n), \text{ otherwise.} \qquad \text{[Equation 1]}$$

The channel estimator, which takes the time average on the CIR of the channel estimated by the LS method, accurately estimates the CIR of the channel for a static channel that is a multipath, thereby providing characteristics remarkably superior to those of the equalizer operating as blind in the time domain.

However, in case of the above-explained method, a CIR value exceeding a critical value fails to save pulse tails by a pulse sharing filter of a transmitting end and a matched filter of a receiving end at all, whereby degradation of performance severely occurs.

Besides the above-explained problems, there exists a certain amount of disturbance of a frequency spectrum despite an excellent terrestrial DTV reception environment, whereby reception performance on a dynamic multipath channel is degraded when the related art channel estimator is applied to a DTV receiver.

SUMMARY OF THE INVENTION

Accordingly, the present invention is directed to a channel estimator adopting masking that substantially obviates one or more problems due to limitations and disadvantages of the related art.

An object of the present invention is to provide a channel estimator adopting masking which enables to estimate a channel impulse response (CIR) in a time variable channel more accurately.

Another object of the present invention is to provide a channel estimator adopting masking which enables to enhance tracking performance for a time variable channel of a frequency domain equalizer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a channel estimator using a CIR (channel impulse response) estimating value, a channel estimator adopting masking according to the present invention includes a CIR masking unit removing a noise included in the CIR estimating value.

And, the CIR masking unit includes a mask signal generator generating a mask signal according to the CIR estimating value, a CIR delayer matching a synchronization between the CIR estimating value and the mask signal, and a masking processor removing the noise by performing the masking so that the CIR estimating value is outputted only for a section where the mask signal exits.

In this case, the mask signal generator generates the mask signal based on a CIR critical value and a mask window size wherein the CIR critical value is a minimum value accredited with a real CIR.

Moreover, the masking processor is a multiplexer selecting to output either the CIR estimating value or '0' according to the mask signal.

And, the masking processor is a multiplier multiplying the mask signal and the CIR estimating value together to output the CIR estimating value of a section where the mask signal is not '0'.

In another aspect of the present invention, a channel estimator adopting masking includes a trained sequence generator outputting a trained sequence, a cross correlator finding a cross correlating value between a signal transmitted from an outside and the trained sequence, a max value searcher detecting a maximum value of the cross correlating value by predetermined field unit, a cross correlating vector generator outputting a cross correlating vector amounting to a CIR (channel impulse response) estimating range based on the maximum value of the cross correlating value, a ROM previously storing to output an inverse matrix of an auto correlating value of the trained sequence, an operator finding a CIR estimating value using the inverse matrix of the auto correlating value and the cross correlating vector, and a CIR masking unit removing a noise included in the CIR estimating value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A to 5C are diagrams of test result using a real stream applied to a channel estimator according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
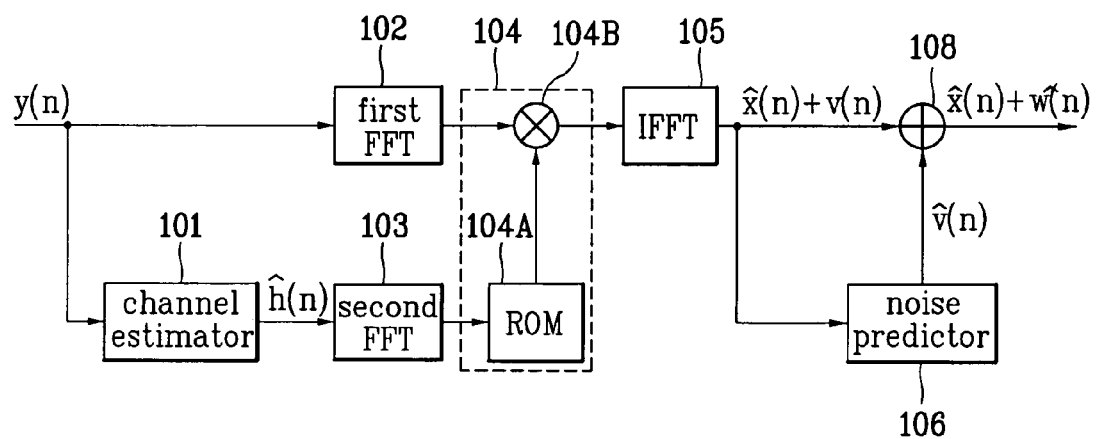
FIG. 1 is a block diagram of a system to which a frequency domain equalizer through channel estimation is applied according to a related art.
Figure 2:
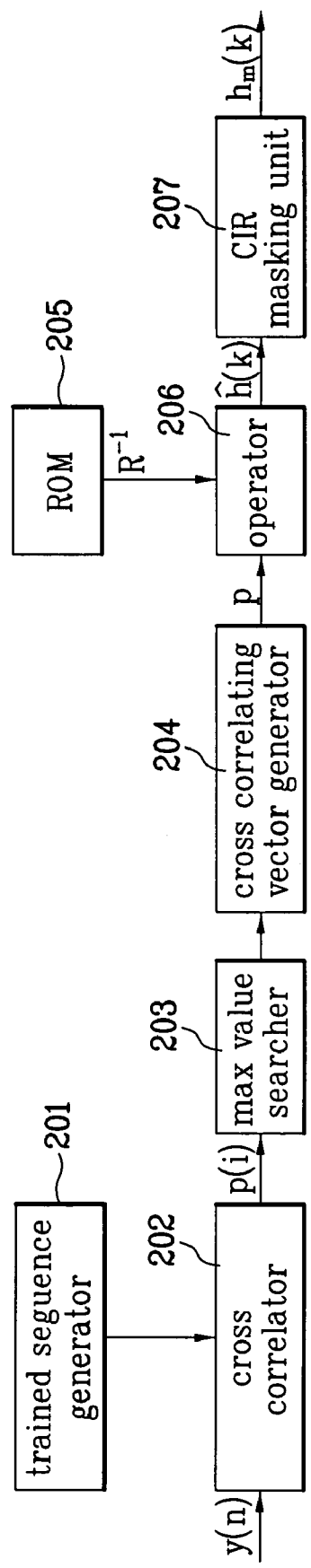
FIG. 2 is a block diagram of a channel estimator according to the present invention.
Figure 3:
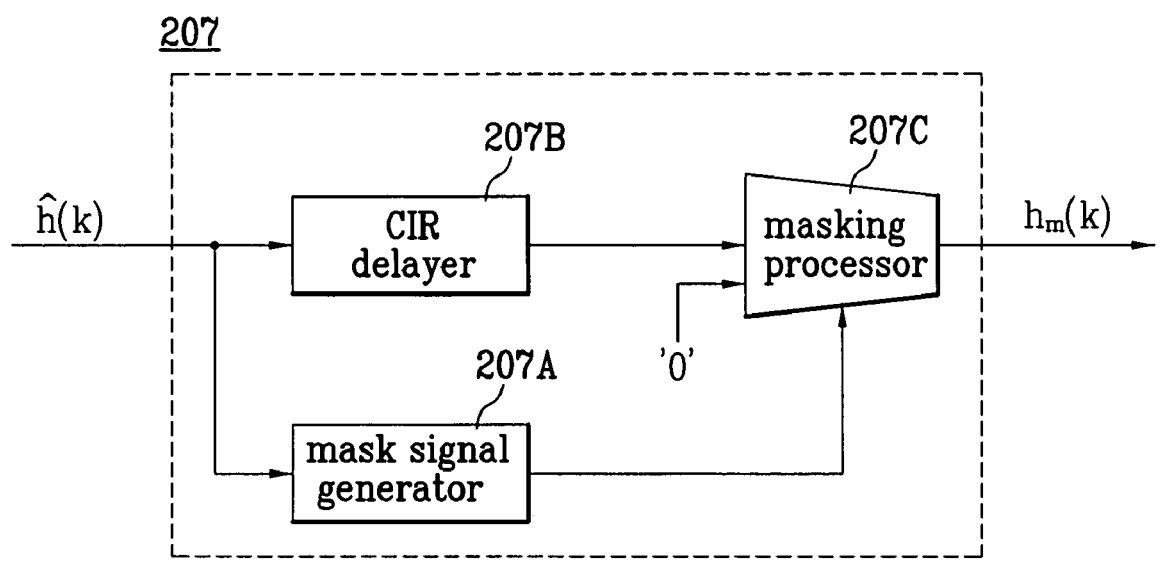
FIG. 3 is a detailed block diagram of a CIR masking unit in FIG. 2.

FIG. 2 is a block diagram of a channel estimator according to the present invention and FIG. 3 is a detailed block diagram of a CIR masking unit in FIG. 2.

Referring to FIG. 2, a channel estimator according to the present invention includes a trained sequence generator 201 outputting a trained sequence, a cross correlator 202 finding a cross correlating value P(i) between a terrestrial TV signal y(n) transmitted from an outside and the trained sequence, a max value searcher 203 detecting a maximum value of the cross correlating value P(i) by predetermined field unit, a cross correlating vector generator 204 outputting a cross correlating vector amounting to a channel impulse response (CIR) estimation range based on the maximum value of the cross correlating value P(i), a ROM 205 outputting an inverse matrix of an auto correlating value of the trained sequence, an operator 206 finding a CIR estimating value ĥ using the inverse matrix $R^{-1}$ of the auto correlating value and the cross correlating vector, and a CIR masking unit 207 removing a noise included in the CIR estimating value ĥ.

The above-constructed channel estimator is explained in detail as follows.

First of all, the trained sequence generator 201 inputs a trained sequence, which has characteristics very similar to those of a white noise that is non-related to the trained sequence reciprocally, to the cross correlator 202. The cross correlator then finds the cross correlating value P(i) between the terrestrial TV signal y(n) transmitted from the outside and the trained sequence.

The max value searcher 203 finds to output a maximum value of the cross correlating values P(i). In this case, such a maximum value is used for finding a real CIR.

The cross correlating vector generator 204 outputs the cross correlating vector P amounting to the CIR estimation range based on the cross correlating value of the field unit used in finding the real CIR by the max value searcher 203.

Meanwhile, the ROM 205 previously stores the inverse matrix $R^{-1}$ of the auto correlating value of the trained sequence, thereby outputting the inverse matrix of the auto correlating value to correspond to the cross correlating vector P between the corresponding trained sequence and the terrestrial TV signal y(n).

The operator 206 then computes the inverse matrix $R^{-1}$ of the auto correlating value and the cross correlating vector P to output the CIR estimating value $\hat{h}$. And, the CIR masking unit 207 removes the noise caused by the data included in the CIR estimating value $\hat{h}$.

The CIR masking unit 207, as shown in FIG. 3, includes a mask signal generator 207A generating a mask signal according to the CIR estimating value $\hat{h}$, a CIR delayer 207B matching a synchronization between the CIR estimating value $\hat{h}$ and the mask signal, and a masking processor 207C removing the noise by performing masking so that the CIR estimating value $\hat{h}$ is outputted only for a section where-the mask signal exits.

In this case, the masking processor 207C is implemented with a multiplexer (MUX), and can be implemented with a multiplier (not shown in the drawing) instead of the multiplexer (MUX).

In case that the multiplexer (MUX) is used as the masking processor 207C, the CIR estimating value $\hat{h}$ is inputted as an input signal of the multiplexer together with '0' and the mask signal is a control signal for selecting either the CIR estimating value $\hat{h}$ or '0'.

Figure 4A:
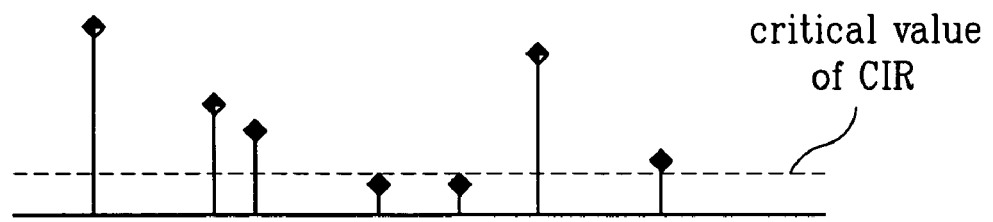
FIGS. 4A to 4D are diagrams of CIR masking and its corresponding transition of a signal according to the present invention.
Figure 4B:

For instance, if the CIR estimating value $\hat{h}$ outputted from the operator 206 has the pattern shown in FIG. 4A, the mask signal, which is generated from the masking signal generator 207A using the CIR estimating value $\hat{h}$, has the pattern shown in FIG. 4B.

Figure 4C:
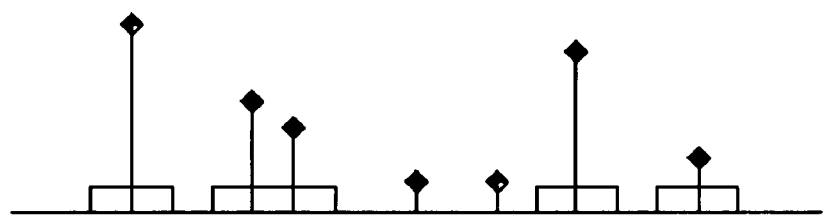
Figure 4D:
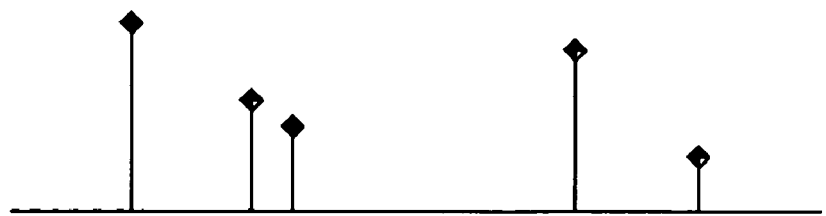

And, FIG. 4C is a diagram of the CIR estimating value $\hat{h}$ and mask signal synchronized by the CIR delayer 207B. If the CIR estimating value $\hat{h}$ and mask signal are inputted to the masking processor 207C, an output of the masking processor 207C is shown in FIG. 4D. Namely, the masking processor 207C generates the output only if the CIR estimating value $\hat{h}$ is greater than a value of the mask signal. Otherwise, the masking processor 207C fails to generate the output.

Meanwhile, the masking signal generator 207A should decide two kinds of parameters when generating the mask signal. Namely, the two kinds of the parameters are a CIR critical value, which is a minimum value accredited with the real CIR, and a mask window size, respectively.

Preferably, the CIR critical value should be experimentally decided. And, the CIR critical value is preferably set to a value between '0.1' and '0.2' when a maximum value of the CIR is normalized as '1' on the situation that there exists no ghost at all. Moreover, the CIR critical value can be set to a value relative to the maximum value of the CIR on the situation that the ghost exists, whereby performance may be degraded on the situation that a noise of a prescribed level is always inputted. Hence, the CIR critical value should be cautiously decided.

Meanwhile, the mask window size should be decided by considering the influence on the noise and the frequency ranges of tails of CIRs exceeding the critical value. In enhancing accuracy of channel estimation by saving more pulse tails, a relatively great amount of noises is included, whereby such a method is ineffective. Hence, about ±10 symbols centering around the CIR exceeding the critical value are experimentally appropriate to the mask window size. In this case, as the value of the CIR becomes greater, so the size and range of the pulse tails increase more. Hence, the mask window size preferably has a variable value proportional to a size of CIR. For instance, when a CIR peak greater than the critical value is generated, the CIR masking unit 207 sets the mask signal to '1' from '0' and maintains '1' as long as the mask window size. In doing so, since the generated mask signal is delayed by ½ of the mask window size for the real CIR, the CIR delayer 207B just matches the synchronization of the CIR to that of the masking signal.

Compared to the conventional LS estimator taking the time average, the channel estimator according to the present invention is expected to enhance its performance on a time variable channel. Test results using a real stream signal are shown in FIGS. 5A to 5C.

The. CIR critical value and mask window size used for the test are 0.1 and ±10 symbols, respectively, and an output SNR (signal to noise ratio) is calculated from an output of an equalizer implemented by frequency domain zero forcing.

In FIGS. 5A to 5C, each 'x' indicates a situation that an error occurs and each dB value represents a mean SNR value on a situation that no error exists.

Referring to FIG. 5A showing a case that there exists no ghost, when the CIR estimating value is inherently applied to an equalizer implemented by zero forcing, an error takes place despite the situation that there exists no ghost unless a time average is taken. Such an error can be avoided by taking the time averages twice at least. Moreover, even if the time averages are taken twice at least, the mean SNR has a poor value of 17.3 dB. Yet, in case of CIR covered with a mask on the same situation, it can be seen that about 27.6 dB SNR is attained.

Referring to FIG. 5B showing a situation that a post ghost of 0 dB for 1 μs exists, a conventional channel estimator using a time average achieves a situation that no error exists by taking averages at least eight times. Yet, in case of adopting the channel estimator according to the present invention, the error can be removed by taking a mask on the CIR estimating value only.

Referring to FIG. 5C showing a situation that 3 dB 1Hz post ghost exists for 1 μs, it can be confirmed that the mean SNR is severely lowered as a range of the time average is widened. On the contrary, in case of adopting the channel estimator according to the present invention, the error can be prevented from occurring by the CIR estimating value only.

Meanwhile, the channel estimator according to the present invention can be applied to a channel estimating system using OFDM (orthogonal frequency division multiplex) or a system adopting an equalizer.

Accordingly, the channel estimator according to the present invention has the following effects or advantages.

First of all, the present invention is capable of filtering noises resulting from finiteness of the PN sequence used in finding the cross correlator, thereby enabling to enhance accuracy for the CIR estimating value.

Secondly, the enhanced accuracy for the CIR estimating value enables to improve tracking performance to the time variable channel of the frequency domain equalizer using the channel estimator.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A channel estimator using a CIR (channel impulse response) estimating value and adopting signal masking, comprising:
    a mask signal generator generating a mask signal according to the CIR estimating value;
    a CIR delayer matching a synchronization between the CIR estimating value and the mask signal; and
    a masking processor removing a noise included in the CIR estimating value by performing the masking so that the CIR estimating value is outputted only for a section where the mask signal exits,
    wherein the CIR estimating value is generated by detecting a maximum value of a cross correlation value between a received signal and a trained sequence, and operating a cross correlating vector generated by using the maximum value and the inverse matrix of an auto correlating value of the trained seguence.

2. The channel estimator of claim 1, wherein the mask signal generator generates the mask signal based on a CIR critical value and a mask window size wherein the CIR critical value is a minimum value accredited with a real CIR.

3. The channel estimator of claim 2, wherein the CIR critical value is set to a value between '0.1' and '0.2' when a maximum value of a CIR is normalized as '1' on a situation that there exists no ghost at all.

4. The channel estimator of claim 2, wherein the mask window size is about ±10 symbols centering around a CIR exceeding the CIR critical value.

5. The channel estimator of claim 1, wherein the masking processor is a multiplexer selecting to output either the CIR estimating value or '0' according to the mask signal.

6. The channel estimator of claim 1, wherein the masking processor is a multiplier multiplying the mask signal and the CIR estimating value together to output the CIR estimating value of a section where the mask signal is not '0'.

7. A channel estimator adopting signal masking, comprising:
    a trained sequence generator outputting a trained sequence;
    a cross correlator finding a cross correlating value between a received signal and the trained sequence;
    a max value searcher detecting a maximum value of the cross correlating value by predetermined field unit;
    a cross correlating vector generator outputting a cross correlating vector amounting to a CIR (channel impulse response) estimating range based on the maximum value of the cross correlating value;
    a ROM previously storing to output an inverse matrix of an auto correlating value of the trained sequence;
    an operator finding a CIR estimating value using the inverse matrix of the auto correlating value and the cross correlating vector; and
    a CIR masking unit removing a noise included in the CIR estimating value.

8. The channel estimator of claim 7, the CIR masking unit comprising:
    a mask signal generator generating a mask signal according to the CIR estimating value;
    a CIR delayer matching a synchronization between the CIR estimating value and the mask signal; and
    a masking processor removing the noise by performing the masking so that the CIR estimating value is outputted only for a section where the mask signal exits.

9. The channel estimator of claim 8, wherein the mask signal generator generates the mask signal based on a CIR critical value and a mask window size wherein the CIR critical value is a minimum value accredited with a real CIR.

10. The channel estimator of claim 9, wherein the CIR critical value is set to a value between '0.1' and '0.2' when a maximum value of a CIR is normalized as '1' on a situation that there exists no ghost at all.

11. The channel estimator of claim 9, wherein the mask window size is about ±10 symbols centering around a CIR exceeding the CIR critical value.

12. The channel estimator of claim 8, wherein the masking processor is a multiplexer selecting to output either the CIR estimating value or '0' according to the mask signal.

13. The channel estimator of claim 8, wherein the masking processor is a multiplier multiplying the mask signal and the CIR estimating value together to output the CIR estimating value of a section where the mask signal is not '0'.

* * * * *